Patented Mar. 18, 1930

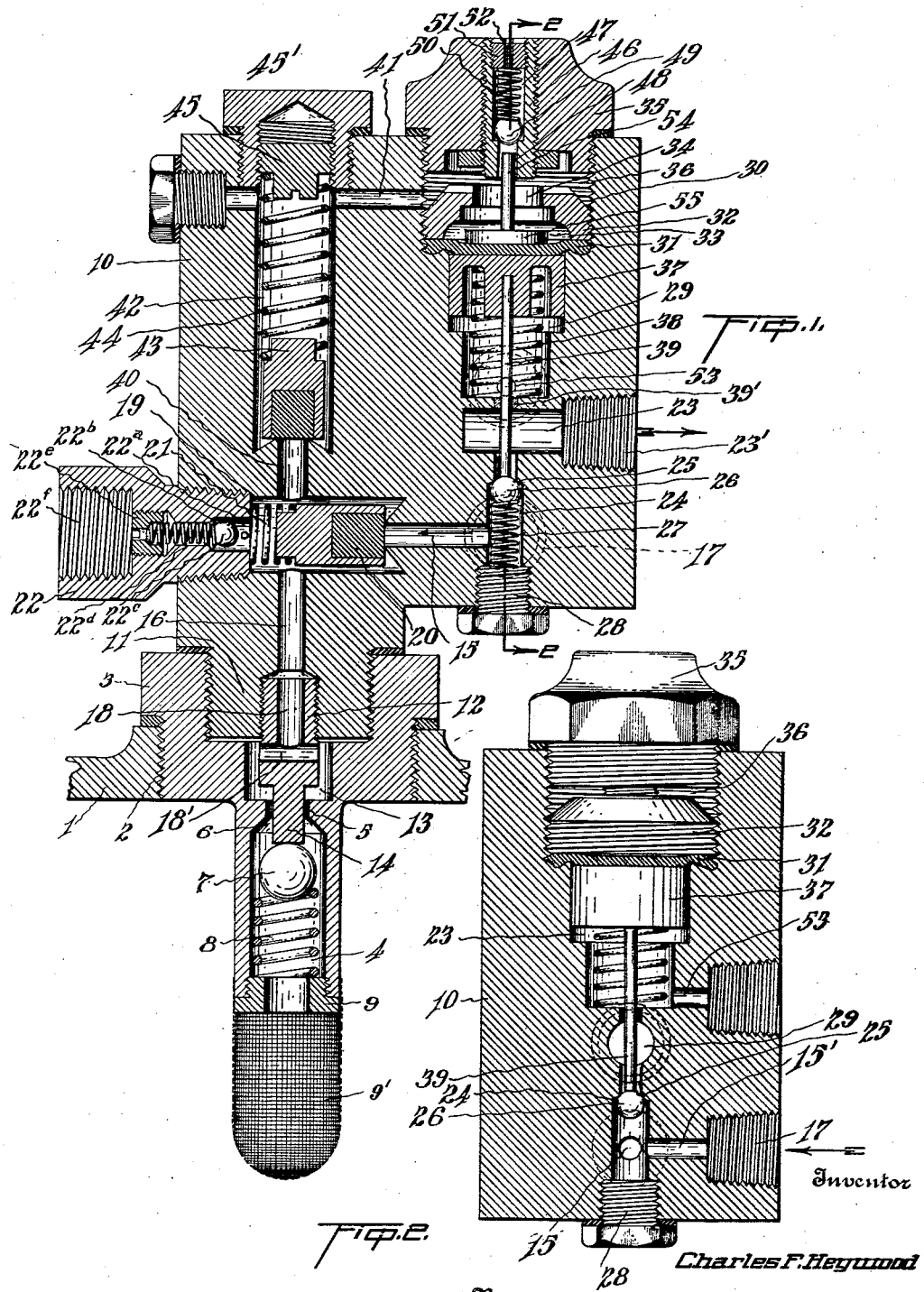

1,751,457

UNITED STATES PATENT OFFICE

CHARLES F. HEYWOOD, OF DETROIT, MICHIGAN, ASSIGNOR TO SKY SPECIALTIES CORPORATION, OF DETROIT, MICHIGAN, A CORPORATION OF MICHIGAN

SAFETY VALVE

Application filed March 26, 1928. Serial No. 264,815.

The present invention pertains to a novel safety valve adapted for insertion between a pump and a receiver for the purpose of preventing the establishment of an excessive pressure in the receiver. The device operates in the same general manner as that disclosed in my co-pending application, Serial No. 105,338, now Patent No. 1,667,154, allowed July 27, 1927, wherein the pump is bypassed to the atmosphere when the maximum desired pressure in the tank is attained.

Both devices include a governing valve which opens only when the maximum pressure is reached and which allows the tank pressure to act on a relief mechanism which opens a bypass between the pump and the atmosphere. In application Serial No. 105,338, the relief mechanism is subjected to the full tank pressure when the tank is overcharged, but it is an object of the present invention to permit only a fraction of the tank pressure, or rather only an excess pressure above the maximum, to act upon the relief mechanism when the tank is overcharged.

Another object of the present invention is to provide a device wherein the relief mechanism will reverse its action and cause the bypass to close before the pressure in the tank has fallen considerably below the permissible maximum. This sensitive action is aided by the provision of a device for relieving the pressure between the governing valve and the relief mechanism, for otherwise this pressure would act against the governing valve which is already provided with the necessary resistance for holding it closed until the maximum tank pressure is exceeded.

The vent from the line between the governing valve and the relief mechanism is controlled by a check valve arranged in such a manner as to be self-cleaning in consequence of the air passed therethrough at intervals.

The invention further contemplates a construction wherein the safety valve may be removed from the tank without permitting the escape of air from the tank. More specifically, the tank inlet into which the device enters is normally closed by a check valve. The safety valve casing carries a pin which, when the device is applied to the tank, moves the check valve and holds it in open position. When the safety valve is removed, the check valve immediately returns to closed position under the action of its spring and the air pressure behind it.

The invention is fully disclosed by way of example in the following description and in the accompanying drawing, in which—

Figure 1 is a sectional view of the device; and

Fig. 2 is a section on the line 2—2 of Figure 1.

Reference to these views will now be made by use of like characters which are employed to designate corresponding parts throughout.

In Figure 1 is illustrated a wall 1 of a tank having a threaded opening 2 for receiving a coupling member 3. In the lower part of the coupling member is formed a chamber 4 communicating with an inlet duct 5 at its upper end. Between the chamber and the duct is formed a valve seat 6 adapted for closure by a ball 7 resting on a compressed spring 8 which in turn is supported on a nut 9 fixed across in bottom of the chamber to which is also fitted a filter 9'.

The safety valve is built in a block or body 10 having at its base a stud 11 which threads into the top of the coupling member 3 as clearly shown in Figure 1. At the lower end of the stud is inserted a smaller stud 12 which is received loosely in a cavity 13 formed in the coupling member above the duct 5. The smaller stud 12 in turn has an extension 14 which holds the ball 7 off its seat when the body 10 is applied to the tank. Without going into the operation of the relief valve, it will be apparent that the latter may be removed without being accompanied by the escape of the gaseous contents of the tank, for when the stud 11 is removed from its aperture, the spring 8 will act to move the ball 7 to its seat 6.

The body 10 obviously provides a path from the charging pump to the tank inlet 5. This path is comprised of perpendicular passages 15 and 16, the former of which has a perpendicular branch 15' at the end of which is formed an enlarged threaded portion 17 at the edge of the body for connection to the pump outlet pipe, while the latter communicates with a longitudinal port 18 and a transverse port 18' drilled in the loosely fitting stud 12 and thereby enabling communication with the inlet 5.

At the intersection of the passages 15 and 16 is a valve chamber 19 containing a valve head 20 adapted to close the inner end of the passage 15. The valve head is backed by a comparatively light spring 21 retained by a plug 22 screwed into the outer end of the valve chamber. This valve mechanism prevents the tank from discharging into the pump although the pump pressure may be less than the tank pressure. The plug 22 also serves as a connection and control for a pressure gauge for indicating the pressure in the tank 1. With this object in view, the inner end of the plug has a cavity 22$^a$ at the base of which is a valve seat 22$^b$. A ball 22$^c$ is adapted to close on the seat under certain conditions but is normally held off the seat by a spring 22$^d$ which bears against a nut 22$^e$ fitted in the plug. The outer end of the plug has a threaded opening 22$^f$ for the attachment of a pipe extending to a pressure gauge. The spring 22$^d$ holds the valve off its seat while the tank pressure is built up on the pressure gauge side of the valve. If the pressure gauge is removed for repair or replacement, the pressure is relieved on the spring side of the ball valve, and the direct tank pressure causes the valve to close, enabling the gauge to be connected or removed without any appreciable loss of air.

A relief chamber 23 is formed above or adjacent the passage 15 and is susceptible of communication therewith through a connection 24. This connection has a valve seat 25 adapted for closure by a ball valve 26 backed by a spring 27 which abuts a plug 28 threaded into the wall from which the connection is drilled. The relief chamber 23 is relieved to the atmosphere or to another receptacle through a duct 23'.

Adjacent or above the relief chamber 23 is a larger threaded opening 30 on the base of which is mounted a diaphragm 31. The edges of the diaphragm are clamped in the body 10 by a nut 32 having a concave lower face 33 and a central port 34. Into the top of the opening 30 is threaded a nut 35 which leaves a space 36 above the nut 32.

Above the relief chamber 23, but separated therefrom, is formed another chamber 29 containing a plunger 37 supported on and normally held in a raised position by a spring 38 disposed in the bottom of the chamber. A pin 39 extends downwardly from the plunger towards the ball valve 26 and is adapted to open the valve when the plunger moves downwardly under the action of the diaphragm presently to be described. The pin 39 fits tightly in a gasket 39' fitted in the portion of the body separating the chamber 23 and 29.

A line is provided in the block between the valve chamber 19 and space 36 and consists of perpendicular branches 40 and 41 communicating respectively with these parts. At the intersection of the branches is formed a valve chamber 42 containing a valve head 43 adapted to seat upon an end of the branch 40. The valve is normally backed and closed by a spring 44 which in turn abuts a nut 45 adjustably fitted in a plug 45' threaded into the valve chamber from the side of the body 10.

The pressure of the spring 44 is such that it will not permit the valve head 43 to move from its seat until the maximum desired pressure in the tank is exceeded. The tank pressure is constantly exerted on the valve head through the tank inlet, space 13, duct 18, branch 16, valve chamber 19, and branch 40. The valve heads 20 and 43 are preferably provided with an insert of a special elastic compound at the seating portions thereof, this compound being particularly adapted to form a perfect seal when the valves are in closed position.

When the valve head 43 is moved to open position, the tank pressure in excess of the spring 44 will be communicated to the space 36, and through the port 34 to the top of the diaphragm 31 which will be displaced and will move the plunger 37 towards the ball valve 26. The ball valve 26 will now open and will permit the discharge of the pump to be bypassed through the connection 24 and relief port 23'.

When the tank pressure has fallen to normal the valve 43 will close, the plunger 37 will be returned to its normal position under the action of its supporting spring 38, and the bypass ball valve 26 will be brought to closed position by the spring 27. In order that this action of the plunger may not be resisted by compressed gas trapped in the space 36 and branch 41, the former is vented to the atmosphere. The means for this purpose includes a chambered member 46 threaded axially in the plug 35 and having a chamber 47 communicating through a duct 48 with the space 36. A ball valve 49 rests on the base of the chamber, closing the duct, and held in this position by a spring 50 which abuts a plug 51 threaded in the top of the chamber 47. This plug has an axial port 52 leading to the atmosphere. The spring 50 is slightly stronger than the spring 38 so that the chamber 42 will not exhaust through the port 52 before the plunger is lowered in the manner already described.

The tank 1 obviously has a connection to a suitable valve which in turn controls the flow of compressed air to the apparatus to be operated under air pressure. Such valve has a return connection 53 to the chamber 29 at a point below the plunger 37. If the plunger 37 fails to rise and permit the ball valve 26 to close after having been opened and after a normal pressure in the tank has been restored, a subsequent operation of the control valve (previously mentioned but not illustrated) will permit compressed air at somewhat below tank pressure to enter the chamber 29 and raise the plunger 37 together with the rod 39 carried thereby, whereby the ball valve 26 will promptly seat.

A stem 54 slidable in the duct 48 has at its lower end a foot 55 resting on the upper side of the diaphragm. The previously described lifting of the plunger when the control valve is opened raises the stem 54 and moves the ball valve 49 from its seat, in order to relieve whatever pressure may remain in the space 36 and communicating passages, as well as any accumulation of oil. Such venting of the space 36 and communicating chambers is necessary to the sensitive operation of the device for it will be understood that the spring 42 is set to permit the valve 43 to open when the maximum pump pressure is reached, and the resistance to the opening of this valve should not be much augmented by pressure accumulating behind it. The seat for the ball valve 49 is swept clean each time this valve is opened by excess pressure in the space 36 or chamber 29. The valve therefore is otherwise fully seated because dirt cannot accumulate in the valve seat to produce leakage through the valve when the member 49 is in closed position.

Although a specific embodiment of the invention has been illustrated and described, it will be understood that various alterations in the details of construction may be made without departing from the scope of the invention as indicated by the appended claims.

What I claim is:—

1. A pressure regulating device adapted for connection between a pump and a receiver and establishing a path therebetween, said device having a chamber, a line of communication from said path to said chamber, a pressure operated member in said chamber having one side exposed to said line, a normally closed governing valve in said line adapted to open in the direction towards said chamber, a relief passage extending from said path, a normally closed valve in said passage, and a valve operating member extending from said pressure operated member towards said last named valve and adapted to open the same on displacement of said pressure operated member.

2. A pressure regulating device adapted for connection between a pump and a receiver and establishing a path therebetween, said device having a chamber, a line of communication from said path to said chamber, a pressure operated member in said chamber having one side exposed to said line, means opposing movement of said pressure member, a relief passage extending from said path, a normally closed valve in said passage, a valve operating member extending from said pressure operated member towards said last named valve and adapted to open the same on displacement of said pressure operated member, and a normally closed check-valve-controlled vent from said line.

3. A pressure regulating device adapted for connection between a pump and a receiver and establishing a path therebetween, said device having a chamber, a line of communication from said path of said chamber, a pressure operated member in said chamber having one side exposed to said line, a normally closed governing valve in said line adapted to open in the direction towards said chamber, a relief passage extending from said path, a normally closed valve in said passage, a valve operating member extending from said pressure operated member towards said last named valve and adapted to open the same on displacement of said pressure operated member, a normally closed check-valve-controlled vent from said line, and means operable by said pressure operated member for opening said vent.

4. A pressure regulating device adapted for connection between a pump and a receiver and establishing a path therebetween, said device having a chamber, a line of communication from said path to said chamber, a diaphragm in said chamber having one side exposed to said line, means opposing movement of said pressure member, a relief passage extending from said path, a normally closed valve in said passage, a plunger engageable by the opposite side of said diaphragm, and a valve operating member extending from said plunger towards said last named valve and adapted to open the same on displacement of said diaphragm by pressure in said line.

5. A pressure regulating device adapted for connection between a pump and a receiver and establishing a path therebetween, said device having a chamber, a line of communication from said path to said chamber, pressure actuated relief means in said chamber, means opposing movement of said pressure member, and a normally closed check-valve-controlled vent from said line.

6. A pressure regulating device adapted for connection between a pump and a receiver and establishing a path therebetween, said device having a chamber, a line of communication from said path to said chamber, a diaphragm in said chamber having one side exposed to said line, means opposing movement of said pressure member, a connection between said path and chamber at the opposite side of the diaphragm, a normally closed valve in said connection, and a spring supported plunger engageable by said opposite side of the diaphragm and adapted to actuate said valve on displacement of the diaphragm, a relief passage extending from said chamber.

7. A pressure regulating device adapted for connection between a pump and a receiver and establishing a path therebetween, said device having a chamber, a line of communication from said path to said chamber, pressure actuated relief means in said chamber, means opposing movement of said pressure member, a normally closed check-valve-controlled vent from said line, and means operable by said relief means for opening said vent.

8. A pressure regulating device adapted for connection between a pump and a receiver and establishing a path therebetween, said device having a chamber, a line of communication from said path to said chamber, pressure actuated relief means in said chamber, means opposing movement of said pressure member, a normally closed check-valve-controlled vent from said line, means operable by said relief means for opening said vent, a spring normally holding said relief means closed, and another spring normally holding said vent closed, the latter spring being stronger than the former.

9. A pressure regulating device adapted for connection between a pump and a receiver and establishing a path therebetween, said device having a chamber, a line of communication from said path to said chamber, a pressure operated member in said chamber having one side exposed to said line, means opposing movement of the pressure member, a relief passage extending from said path, a normally closed valve in said passage, and a valve operating member extending from said pressure operated member towards said last named valve and adapted to open the same on displacement of said pressure operated member.

10. A pressure regulating device adapted for connection between a pump and a receiver and establishing a path therebetween, said device having a chamber, a line of communication from said path to said chamber, a pressure operated member in said chamber having one side exposed to said line, spring means opposing movement of said pressure member, a relief passage extending from said path, a normally closed valve in said passage, and a valve operating member extending from said pressure operated member towards said last named valve and adapted to open the same on displacement of said pressure operated member.

In testimony whereof I affix my signature.

CHARLES F. HEYWOOD.